United States Patent [19]
Sakamoto et al.

[11] Patent Number: 5,202,905
[45] Date of Patent: Apr. 13, 1993

[54] MODEN SIGNAL DETECTING SYSTEM FOR ADAPTIVE DIFFERENTIAL PCM CODEC

[75] Inventors: Keizo Sakamoto, Kanagawa; Yoshihiro Tomita; Hironori Orihara, both of Tokyo, all of Japan

[73] Assignee: Fujitsu Limited, Kawasaki, Japan

[21] Appl. No.: 614,197

[22] Filed: Nov. 16, 1990

[30] Foreign Application Priority Data

| Nov. 16, 1989 | [JP] | Japan | 1-297830 |
| Feb. 19, 1990 | [JP] | Japan | 2-36229 |
| Apr. 6, 1990 | [JP] | Japan | 2-92610 |
| Jun. 7, 1990 | [JP] | Japan | 2-149063 |

[51] Int. Cl.$^5$ .......................................... H04L 23/00
[52] U.S. Cl. ........................................ 375/121; 375/8
[58] Field of Search ............... 375/7, 8, 13, 76, 121, 375/27; 307/269, 358, 359; 379/93, 98

[56] References Cited

U.S. PATENT DOCUMENTS

| 3,479,599 | 11/1969 | Molik | 375/76 |
| 4,318,128 | 3/1982 | Sauvanet | 375/76 |
| 4,433,425 | 2/1984 | de Jaeger | 375/13 |
| 4,606,045 | 8/1986 | Miller | 375/13 |
| 4,780,886 | 10/1988 | Maddens | 375/76 |
| 4,788,692 | 11/1988 | Takebayashi | 375/27 |
| 4,956,851 | 9/1990 | Wolensky et al. | 375/8 |

OTHER PUBLICATIONS

"Considerations on V.299600 Bit/s Voiceband Data Transmission" from CCITT, 1986.
"Usefulness of the Proposed Method of Switching to Data-Optimized Parameters in G.721 ADPCM", CCITT, 1986.
"32kBit/s Adaptive Differential Pulse Code Modulation (ADPCM)", Recommendation G.721, 1984, pp. 125-131.

Primary Examiner—Stephen Chin

[57] ABSTRACT

A modem signal detecting system for an adaptive differential code modulation system, which is intended for detecting a modem training signal, comprises a comparison and decision circuit which receives an input signal from a signal power calculator and compares a signal power level during a silent period and a training period of a modem training signal. The comparison and decision circuit then decides whether or not the transmission quality of the transmission line is suitable for the modem communication.

12 Claims, 15 Drawing Sheets

MODEN SIGNAL DETECTING SYSTEM FOR ADAPTIVE DIFFERENTIAL PCM CODEC

BACKGROUND OF THE INVENTION

The present invention relates to a modem signal detecting system for an adaptive differential PCM CODEC providing a coding characteristic suitable for modem signals by detecting the start and the end of modem communication.

An adaptive differential pulse code modulation coding system (herein-after referred to as ADPCM coding system) is intended to effectively transmit voice signals with lower transmission rate (bandwidth) as compared with the conventional PCM system by utilizing the statistic characteristic of the power spectrum of voice signals shown in FIG. 1.

In application of such ADPCM coding system in an existing communication network, it is desirable to provide data transmission of a voice band modem signal in addition to the voice signal, but the power spectrum of the voice band modem signal shows less fluctuation, as shown in FIG. 2, apparently indicating different statistic characteristic, while the signal power of the voice signal shows fluctuation of about 40 dB.

For the ADPCM coding system, the CCITT recommends (G721) a coding algorithm for realizing the voice signal transmission with the bit rate of 32 kbits/sec by reducing the bandwidth of the voice signal to $\frac{1}{2}$. This coding algorithm utilizes, as explained previously, the statistic characteristic of the power spectrum of the voice signal shown in FIG. 1. Accordingly, such algorithm is not suitable for coding the modem signal having the power spectrum as shown in FIG. 2 and it only compensates for the coding of the modem signal with a maximum bit rate of 4,800 bit/sec.

Therefore, the modem signal of 9,600 bit/sec which is most widely used under the regulation GIII for the facsimile communication cannot be transmitted with this coding algorithm.

To avoid the above disadvantage, a system has been proposed in U.S. Pat. No. 4,788,692, the disclosure of which is incorporated herein by reference, which system switches the coding algorithm to the algorithm for the modem communication only when the modem communication is decided by detecting a modem training signal. The modem training signal is detected in this system by monitoring the initial modem training signal of 9600 bit/sec. Namely, when an input signal drops to a value exceeding the decided level, the end of the modem communication is detected. Such modem communication should be always detected even in case a transmission line noise level is comparatively high.

SUMMARY OF THE INVENTION

Therefore, it is an object of the present invention to ensure detection of the moden training signal without the influence of network noise in order to detect the start of the modem communication.

It is another object of the present invention to reliably and quickly switch the modem coding mode to the voice coding mode without the influence of network noise by detecting the end of the modem communication.

These and other objects of the invention are attained by a modem signal detector for detecting a modem training signal for use in an adaptive differential coding system, the detector comprising: means for detecting and deciding a first signal pattern of a modem training signal; means for detecting a second signal pattern inverting a phase of the first signal after detection of the first signal pattern of the modem training signal; timer means for counting a time passage of a predetermined time period after detecting and deciding said first signal pattern; and reset means for resetting said detection and decision means of said first signal pattern when said second signal pattern is not detected within the predetermined time period counted by said timer means after detection and decision of said first signal pattern.

The aforementioned objects, features and advantages of the invention will, in part, be pointed out with particularity, and will, in part, become obvious from the following more detailed description of the invention, taken in conjunction with the accompanying drawing, which form an integral part thereof.

DETAILED DESCRIPTION OF THE PREFERRED EMBODIMENTS

The start and the end of the modem communication are generally conducted as follows. The start of the modem communication is detected by monitoring a modem training signal, while the termination of the modem communication is detected by detecting a drop of the receiving signal in the modem communication, exceeding the decision level.

Figure 1:
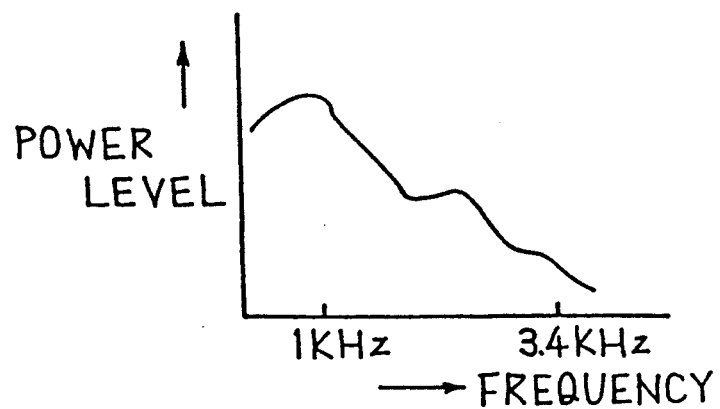
FIG. 1 is a graph showing a transmission rate fluctuation of the voice signal of the PCM system.
Figure 2:
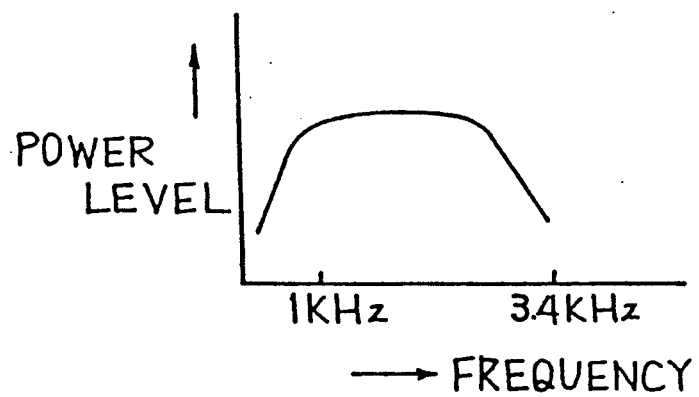
FIG. 2 is a graph showing a transmission rate fluctuation of the modem signal in ADPCM system.
Figure 3:
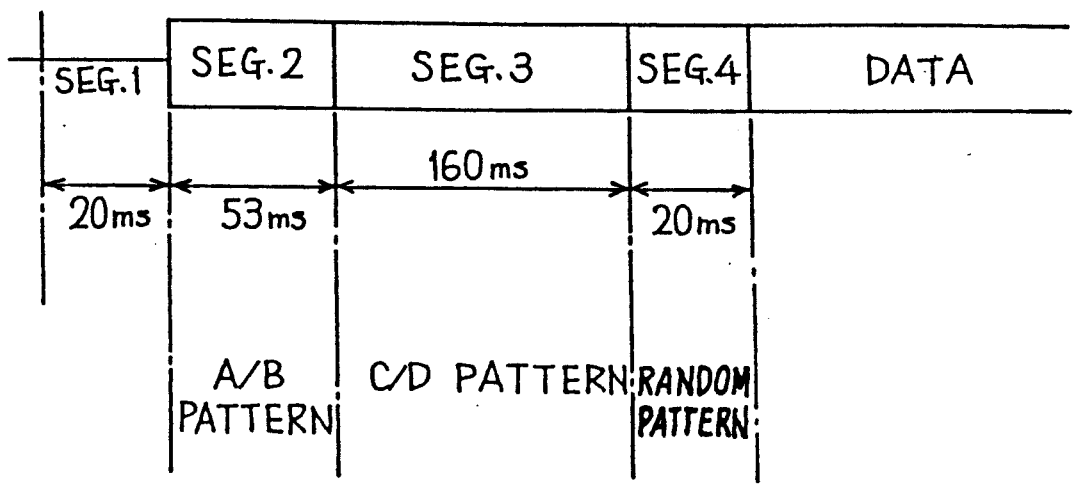
FIG. 3 is a table showing patterns of signals in four time periods during the start of switching from a voice signal coding mode to a modem signal coding mode.

In the case of the modem communication signal of 9600 bit/sec (V29 modem communication) recommended by CCITT, data is transmitted by a 16-level QAM modulation with the carrier frequency of 1700 Hz and the training signal is transmitted for a constant period of time for initiation of the internal condition of the modem system prior to the transmission of data. This training signal is formed, as shown in FIG. 3, by four kinds of signals in time periods identified here as segments 1–4. The segment 1 designates the silent period of 20 ms; the segment 2 designates an A/B pattern period of 53 ms; the segment 3 designates a C/D pattern period of 160 ms and segment 4 designates a random pattern period of 20 ms.

The segments 2 and 3 are modulation periods of A/B, C/D patterns, respectively, and include the sine wave signal components of 500 Hz, 1700 Hz and 2900 Hz and the signal phase changes of 180 degrees (reverses) at the boundary of segments 2 and 3.

Therefore, after the silent period of 20 ms, when an input signal level is, for example, −35 dBmO or higher, output signal levels of band rejection filters of 500 Hz, 1700 Hz and 2900 Hz are lower than the predetermined level and the period, during which an output signal level of a band-pass filter of 2900 Hz indicates ⅓ of all signal levels, continues for 25 to 48 ms or longer, preparation or switching from the voice signal coding mode to the modem signal coding mode is started. Thereafter, an output signal of the phase lock loop circuit (PLL) synchronized with the carrier frequency of 1700 Hz of the modem communication is monitored. At the boundary of segments 2 and 3, since the phase of the sine wave signal is inverted by 180 degrees, it is detected by PLL and the start of the modem communication is decided. Thereby, the voice signal coding mode is switched to the modem signal coding mode and the modem communication is initiated.

After the start of the modem communication, when the receiving signal becomes, for example, −35 dBmO or less, the end of the modem communication is detected.

Figure 4:
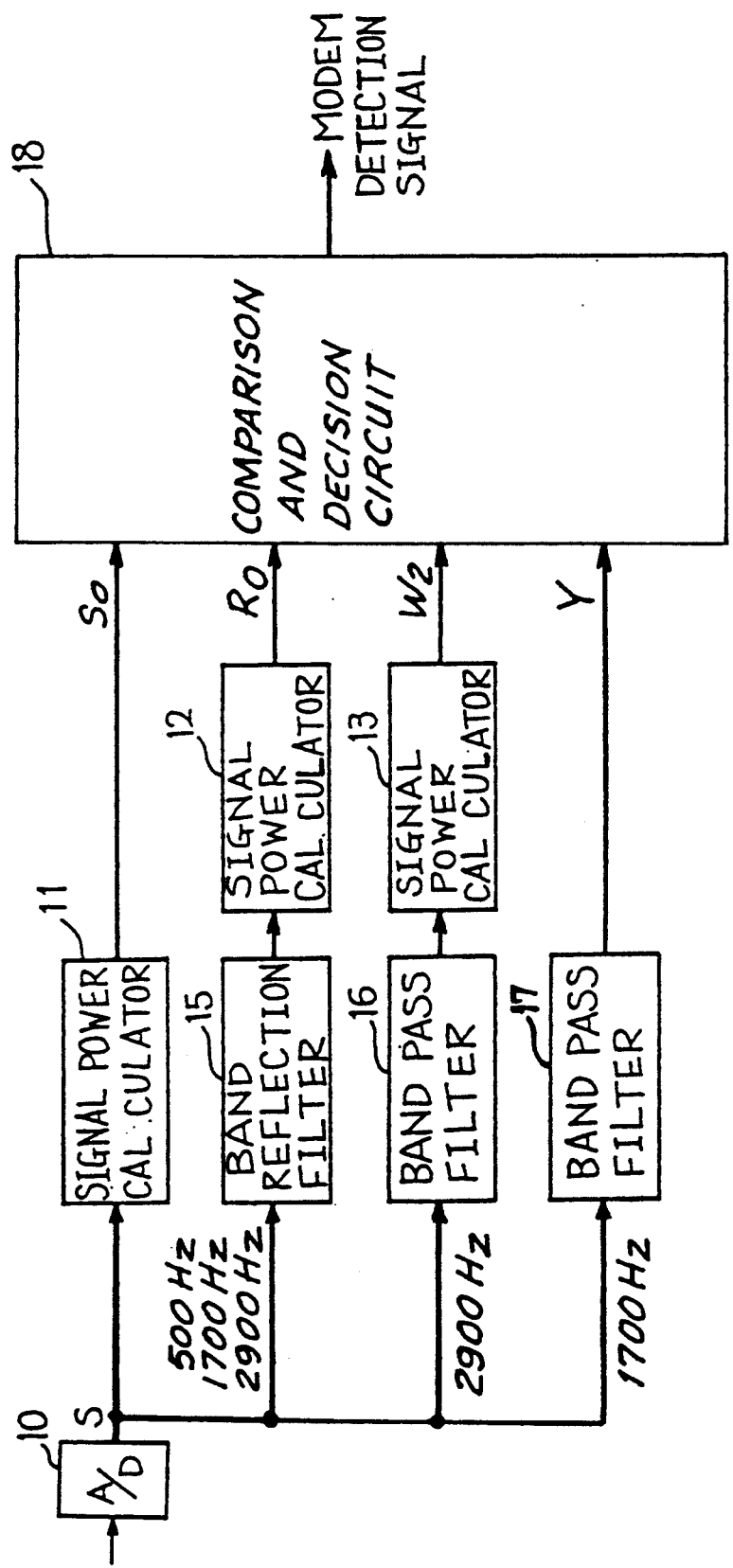
FIG. 4 is a block diagram of a modem signal detector according to the invention.

FIG. 4 is a block diagram of an embodiment of a modem training signal detector, where numeral 10 denotes an analog to digital converter A/D and reference numerals 11 and 13 denote signal power calculators. The modem signal detector further includes a band reflection filter 15 connected to the power calculator 12, bandpass filters 16, 17 and a comparison and decision circuit 18 receiving signals from power calculators 11, 12, 13 and bandpass filter 17. As explained previously, in the 9600 bit/sec modem system, the sine wave signals of three kinds of frequencies (500 Hz, 1700 Hz, 2900 Hz) within the voice frequency band are used as training signals. The band reflection filter 15 has a structure adapted to reflect the frequencies of 500 Hz, 1700 Hz, and 2900 Hz. Bandpass filter 16 has a structure adapted to transmit the frequency of 2900 Hz and a bandpass filter 17 has a structure adapted to transmit the frequency of 1700 Hz.

The power of receiving signal S converted to a digital signal by the A/D converter 10 is calculated in the signal power calculator 11. The power of the frequency components other than the frequencies 500 Hz, 1700 Hz and 2900 Hz reflected by the band-reflection filter 15 is also calculated by the signal power calculator 12. Moreover, the power of signals transmitted by the bandpass filter 16 is calculated by the signal power calculator 13. A signal power calculator can also be connected between bandpass filter 17 and circuit 18. The start and the end of the decision circuit 18 using output signals $S_0$, $R_0$, $W_2$ of the signal power calculators 11 to 13 and the output signal Y of the bandpass filter 17.

The output signals of the signal power calculators 11 to 13 and the output signal of bandpass filter 17 are referred to hereinbelow as the receiving output signal $S_0$, band reflection output signal $R_0$, 2900 Hz receiving output signal $W_2$ and 1700 Hz receiving output signal Y.

Conditions for detecting the start of the modem communication are as follows:
1. The level of the receiving output signal $S_0 >$ the level during the silent period.
2. The level of the band-reflection output signal $R_0 >$ constant level.
3. The period during which the level of 2900 Hz receiving output signal $W_2$ takes about ⅓ of the level of receiving output signal $S_0$, continues for a constant period of time or longer.

When all three above conditions are satisfied, the preparation for switching to the modem signal coding mode is started.

Thereafter, when the phase inversion of sine wave signals between the segments 2 and 3 of modem the training signal shown in FIG. 3 is detected, the start of the modem communication is decided and the voice signal coding mode is switched to the modem signal coding mode.

Whether the above listed conditions are satisfied or not is decided in the comparison and decision circuit 18 shown in FIG. 4.

Figure 5:
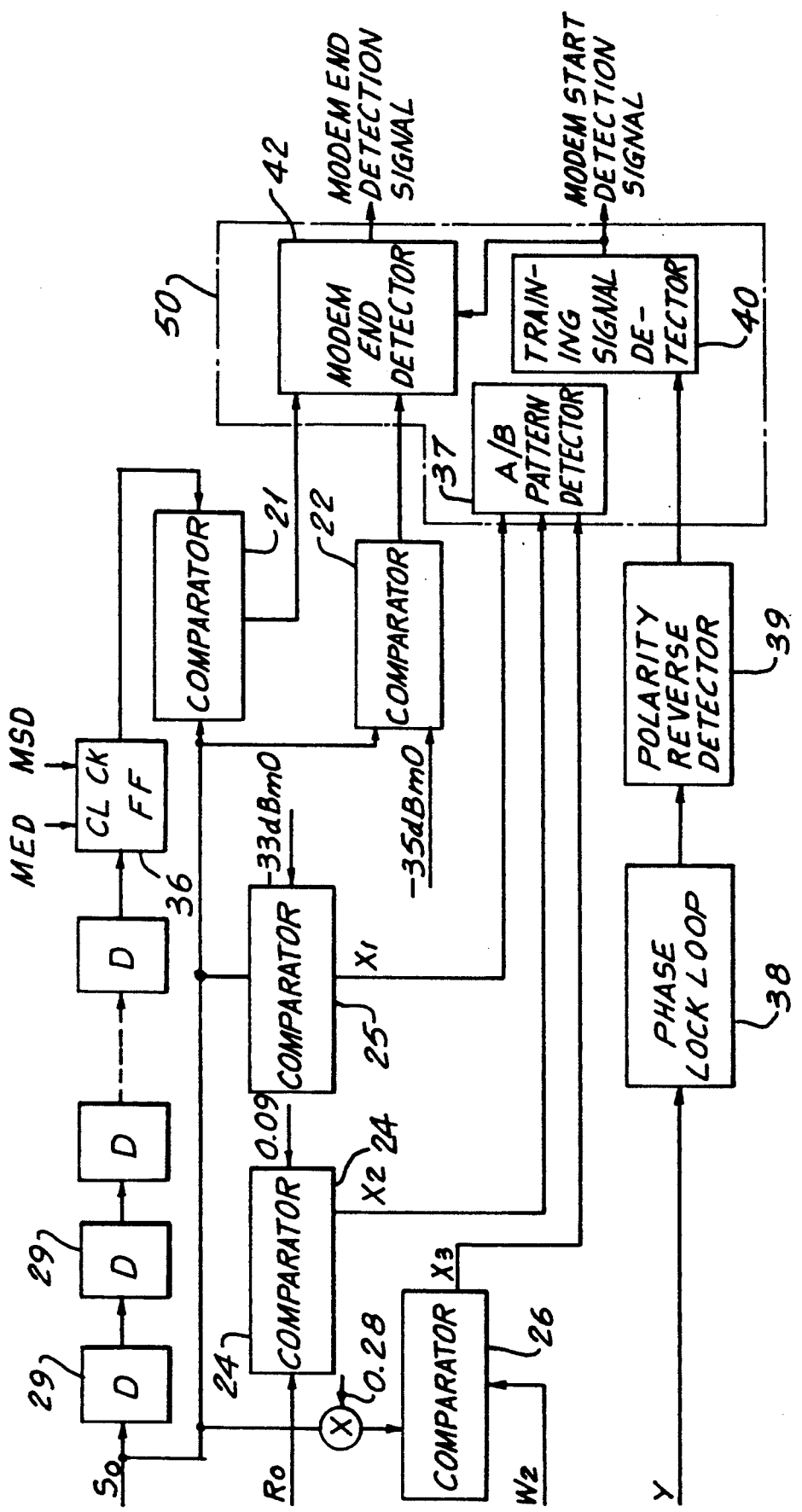
FIG. 5 is a block diagram of a comparison and decision circuit of the modem signal detector of FIG. 4.

FIG. 5 illustrates a block diagram of the comparison and decision circuit 18. This circuit comprises comparators 21, 22, 24, 25, 26, a delay circuit including delay elements 29, a flip-flop circuit 36 (FF), an A/B pattern detector 37, a phase lock loop circuit 38 (PLL), a polarity detector 39, a training signal detector 40, and a modem end detector 42.

The A/B pattern detector 37, training signal detector 40 and modem end detector 42 form a signal processor 50. The receiving output signal $S_o$ is applied to the flip-flop circuit 36 via a delay circuit consisting of a plurality of series-connected delay elements 29. The flip-flop circuit 36 is cleared when the modem communication end detection signal MED is applied to a clear terminal CL. The flip-flop circuit 36 stores the receiving output signal $S_0$ when the modem communication start detection signal MSD is applied to a clock terminal CK thereof. Therefore, a delay time of the delay circuit is set so that the level of the receiving output signal $S_0$ in the silent section of the preceding segment 1 is stored when the start of the modem communication is detected by phase reverse of the training signal between the segments 2 and 3. As will be understood from FIG. 3, it is recommended that this delay time is set to 53 ms or longer and 73 ms (53+20 ms) or less.

The set output signal level (level in the silent section of segment 1) of the flip-flop circuit 36 is considered as a threshold level for detection of the end of modem communication and it is then compared with the receiving output signal $S_0$ in the comparator 21. Moreover, the receiving output signal $S_0$ is compared, in the comparator 22, with a constant level, for example, −35 dBmO corresponding to the silent period. The output signals of the comparators 21 and 22 are input to the modem end detector 42.

The receiving output signal $S_0$ is input to the comparators 25, 26. In the comparator 25, the receiving output signal $S_0$ is compared with a constant level, $-33$ dBmO which is higher than that corresponding to the silent period and a comparison output signal $X_1$ is then input to A/B pattern detector 37. Namely, the signal for deciding the condition 1 mentioned above is generated. In addition, the band-reflection output signal $R_0$ is compared, in the comparator 24, with a constant level (0.09) and a comparison output signal $X_2$ is input to the A/B pattern detector 37. Namely, the signal for deciding the condition 2 explained above is generated.

The 2900 Hz receiving output signal $W_2$ is compared, in comparator 26, with a signal level obtained by multiplying the receiving output signal $S_0$ by 0.28 and a comparison output signal $X_3$ is input to the A/B pattern detector 37. Namely, the signal for deciding the condition 3 is generated.

Here, the values, $-35$ dBmO, $-33$ dBmO, 0.09 and 0.28 are set based on the following:

When the carrier signal transmitted is turned OFF in the modem, a signal level in the transmission line is indicated by dBmO. It is generally known that the modem is influenced by noise when the carrier signal transmitted is turned OFF and the line level is not zero and becomes about $-45$ dBmO. However, in a FAX system, since the modem signal is transmitted or received using an ordinary telephone line, noise level becomes rather high when the line condition is bad. According to the experiments conducted by the inventors, it is apparent that when the telephone line is used, noise level is about $-35$ dBmO. However, this value $-35$ dBmO is difficult to determine, principally due to the condition of the line used. Therefore, the level in the silent period to be applied to the condition 1 is set to $-33$ dBmO, by adding a decided margin (2 dB).

Moreover, the level of the band-reflection output $R_0$ must be "0" during the modem communication. Howcer, the band-reflection filter 15 cannot perfectly reject the in-band signal and allows such in-band signal to pass therethrough to a certain degree. The level of the in-band signal passing the band-reflection filter during the modem communication is set to 0.09 and it is applied to the condition 2, explained previously.

In addition, the bandpass filter 16 cannot transmit the sine wave signal of 2900 Hz without any attenuation, which results in a small amount of the signal being attenuated. Therefore, the receiving output signal $S_0$ must certainly be multiplied by ⅓(0.33) but such value is set to 0.28, considering a loss generated when the sine wave signal of 2900 Hz passes through the bandpass filter 16.

These values are all based on the results of experiments conducted by the inventors of the present invention.

As explained above, the A/B pattern detector 37 decides to receive the A/B pattern when the receiving output signal $S_0$ has the level higher than $-33$ dBmO (condition 1), the level of the band-reflection output signal $R_0$ is lower than 0.09 (condition 2) and the level of the receiving output signal $W_2$ of 2900 Hz is higher than the receiving output signal $S_0$ multiplied by 0.28.

The deciding and detecting signal transmitted from the A/B pattern detector 37 is applied to the training signal detector 40.

Upon application of the modem start detecting signal MSD, the modem end detector 42 starts the detecting operation and detects the end of the modem communication with a comparison output signal from comparators 21, 22. Detector 42 detects the end of the modem communication with the comparison output signal of comparator 21 when the level of the receiving output signal $S_o$ becomes lower than the noise level during the silent period of segment 1 and the comparison output signal from the comparator 22 when the level of receiving output signal $S_o$ becomes lower than $-35$ dBmO indicating the silent period and outputs the modem end detecting signal MED, as shown in FIG. 5. With this modem end detecting signal MED, the modem signal coding mode is returned to the voice signal coding mode.

Figure 6:
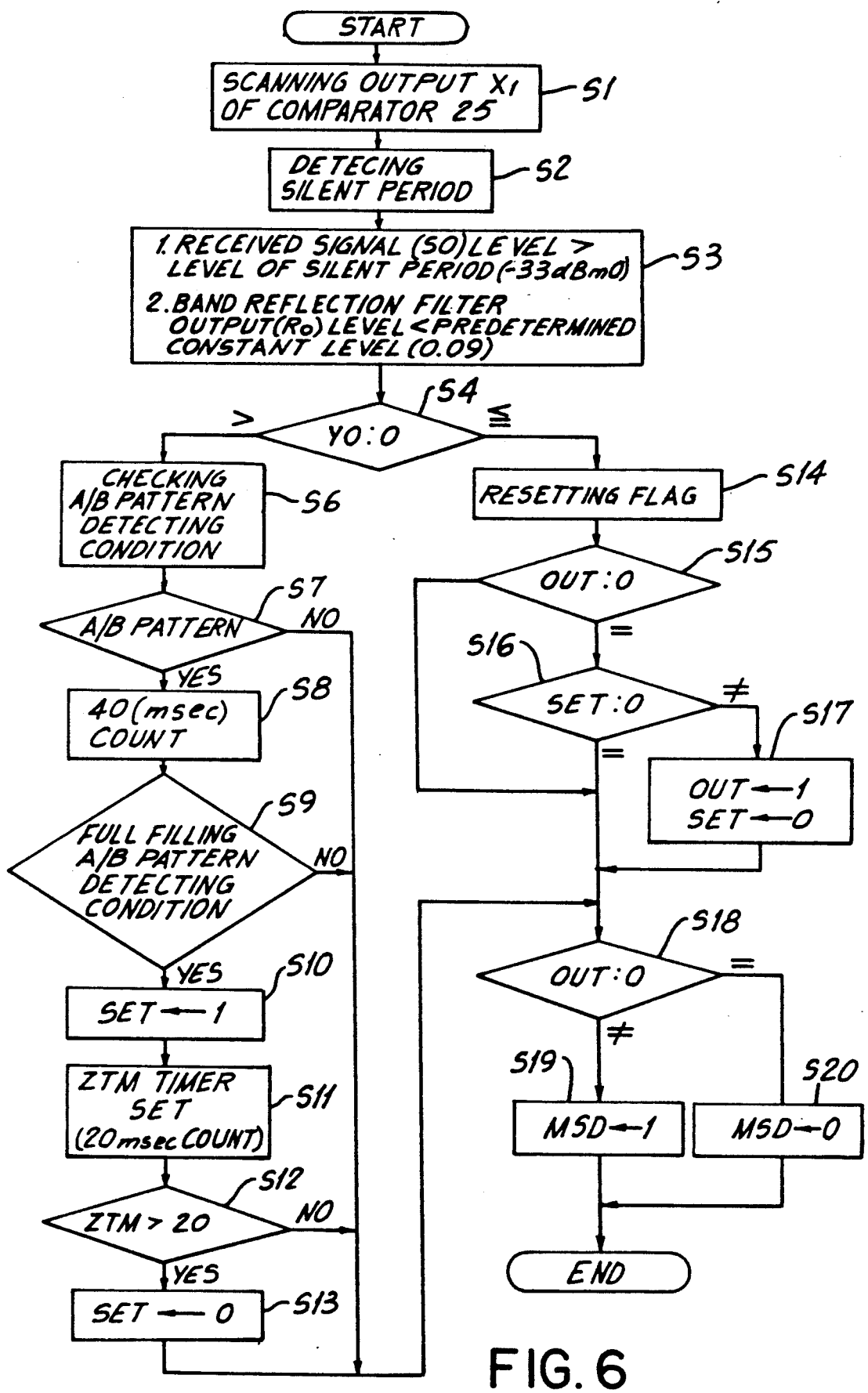
FIG. 6 is a flow chart diagram illustrating the mode of operation of an A/B pattern detector and a modem training signal detector of the circuit of FIG. 5.

Now, operations of A/B pattern detector 37 and training signal detector 40 will be explained in greater detail with reference to a flow chart diagram of FIG. 6.

The A/B pattern detector 37 monitors an output signal $X_1$ of comparator 25 (step S1). When the output signal $X_1$ indicates that the receiving output signal $S_o$ is $<-33$ dBmO, the detection of the silent period (segment 1) is decided (step S2). Thereafter (step S3), when it is detected that the output signal $X_1$ of comparator 25 indicates that the level of receiving output signal $S_o$ is $>$ the level of the silent period ($-33$ dBmO) and the output signal $X_2$ of comparator 24 indicates the level of reflecting output signal $R_o<$ than the predetermined level (0.09), the operation moves to the step S4.

It is checked whether the detected output of the PLL circuit 38 makes a zero-cross (polarity decision) or not due to the phase change from A/B pattern to C/D pattern by monitoring an output of the polarity detector 39.

If zero-cross is not executed, it is checked whether the A/B pattern detecting conditions 1, 2 are detected or not in the step S3 with the output signal $X_2$ of comparator 24 and output signal $X_1$ of comparator 25 (step S6). In case conditions 1 and 3 are detected, detection of the A/B pattern is decided and a counter is set (step S7). Establishment of the A/B pattern is decided (steps S8, S9) when the condition that the level of receiving output signal $W_2$ of 2900 Hz is higher than the receiving output signal $S_o$ multiplied by 0.28 and continued for 40 msec. This is detected by the output $X_3$ of comparator 26 and counted. When the A/B pattern is established, "1" is set to the A/B pattern detection set flag SET (step S10) and operation shifts to the next step S18. In case the A/B pattern is not detected or not established, the operation also shifts to step S18.

In step S18, the condition of the out flag OUT, as will be explained later, is checked. Since the out flag OUT is "0" when the zero-cross is not detected in step S4, the modem communication start detecting signal MSD is set to "0", the operation returns to the start of detecting a sequence flow and the same steps are repeated.

In case the polarity detector 39 detects a zero-cross in the output of PLL circuit 38 after the next repeated cycles in step S4, a change from the A/B pattern to the C/D pattern is decided and the operation shifts to step S14. Condition of the out flag OUT is checked in step S15. When the out flag is "0", the condition of set flag SET is checked (step S16). In case the set flag SET is "1" (namely, A/B pattern has been already detected), "1" is set to the out flag OUT and the flag SET is reset to "0" (step S17). Thereafter, operation shifts to step S18. In this case, since the out flag OUT is "1" in step S18, the modem communication start detecting signal MSD is set to "1".

The modem training signal can be detected by repeating such processing sequence.

Here, after the set flag SET indicating establishment of the A/B pattern is set from "0" to "1", zero-cross of the output of the PLL circuit 38 indicating detection of the C/D pattern is detected. Therefore, it is essential to accurately switch the mode to the modem mode by detecting the change from the A/B pattern to the C/D pattern.

For this purpose, the A/B pattern detector 37 detects the A/B pattern to count the time period from the detection time for the decided time with another timer means. If the C/D pattern is not detected by the polarity detector means 39 before the decided time is counted by the timer (zero-cross is not generated), it is estimated that the input of the C/D pattern is ceased for some reasons. Therefore, the result of the A/B pattern detection by the A/B pattern detector 37 is reset and detection of the A/B pattern is repeated.

Detailed explanation will now be made with reference to FIG. 6. The flow chart of FIG. 6 also shows step S11 in which the decided time (20 msec) is counted by a timer after setting the set flag SET to "1", step S12 in which a time period or passage of 20 msec is decided and step S13 for resetting the set flag SET to "0" after 20 msec has passed.

After the set flag SET has been changed from "0" to "1" after establishment of the A/B pattern, a zero-cross is to be detected, thereby indicating that a C/D pattern has been detected. However, in step S10, the time until detection of the C/D pattern from the time "1" is set to set flag SET, is counted. If zero-cross does not appear within the decided time (20 msec), the set flag SET is reset to "0" and the A/B pattern is queued.

In this case, since the pattern duration for establishment of the A/B pattern is 40 msec, as explained above, and the zero-cross queuing time after establishment of the A/B pattern is 20 msec, the total time is 60 msec. Meanwhile, since the A/B pattern duration is 53 msec as shown in FIG. 3, if zero-cross is not detected even after the zero-cross queuing time of 20 msec, it is decided that zero-cross will no longer be detected.

Thereby, even if the C/D pattern is not input after the A/B pattern, it can be prevented that the apparatus intermittently suspends operation waiting for the C/D pattern.

Another embodiment for detection of A/B pattern will be explained hereunder.

Figure 7A:
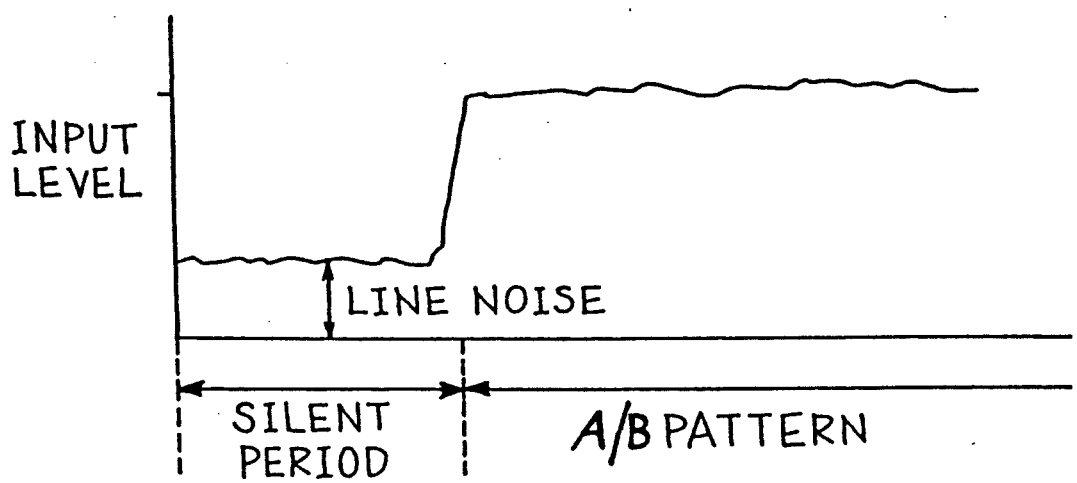
FIGS. 7A and 7B show curves of a signal level at the leading portion of the modem training signal with and without a transmission line noise component, respectively.

FIG. 7A indicates a signal level at the leading portion of the modem training signal to be input to the detector. When the voice signal is switched to the modem signal, the silent period (segment 1) of the modem training signal appears and then the A/B pattern (segment 2) appears. However, the signal level does not become zero since transmission line noise appears during the silent period.

Therefore, here rises a problem that in case a line noise which is similar to the A/B pattern of the modem training signal is input, a line noise may be erroneously detected in place of the A/B pattern, before the actual A/B pattern appears, resulting in influence on the subsequent processings.

Figure 7B:
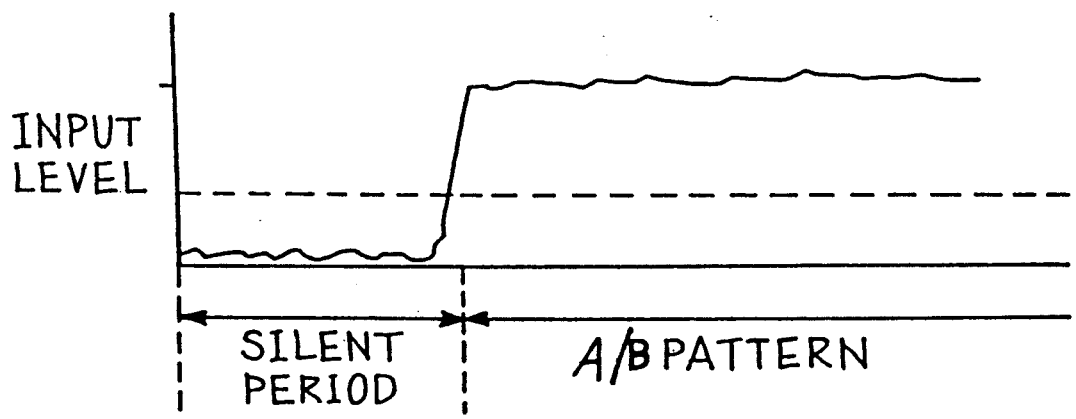

The signal component of the modem training signal during the silent period is almost equal to the line noise component. Therefore, a mean value of the line noise component can be represented by a mean value of the signal level during the silent period. When such a mean value of the transmission line noise component is subtracted from the input signal, the line noise component in the silent period can be almost eliminated. Thereby, erroneous detection of the modem signal pattern resulting from line noise during the silent period can be prevented by detecting the modem training signal detection in the A/B pattern detector 37 with the input signal after eliminating a line noise component (FIG. 7B).

Figure 8:
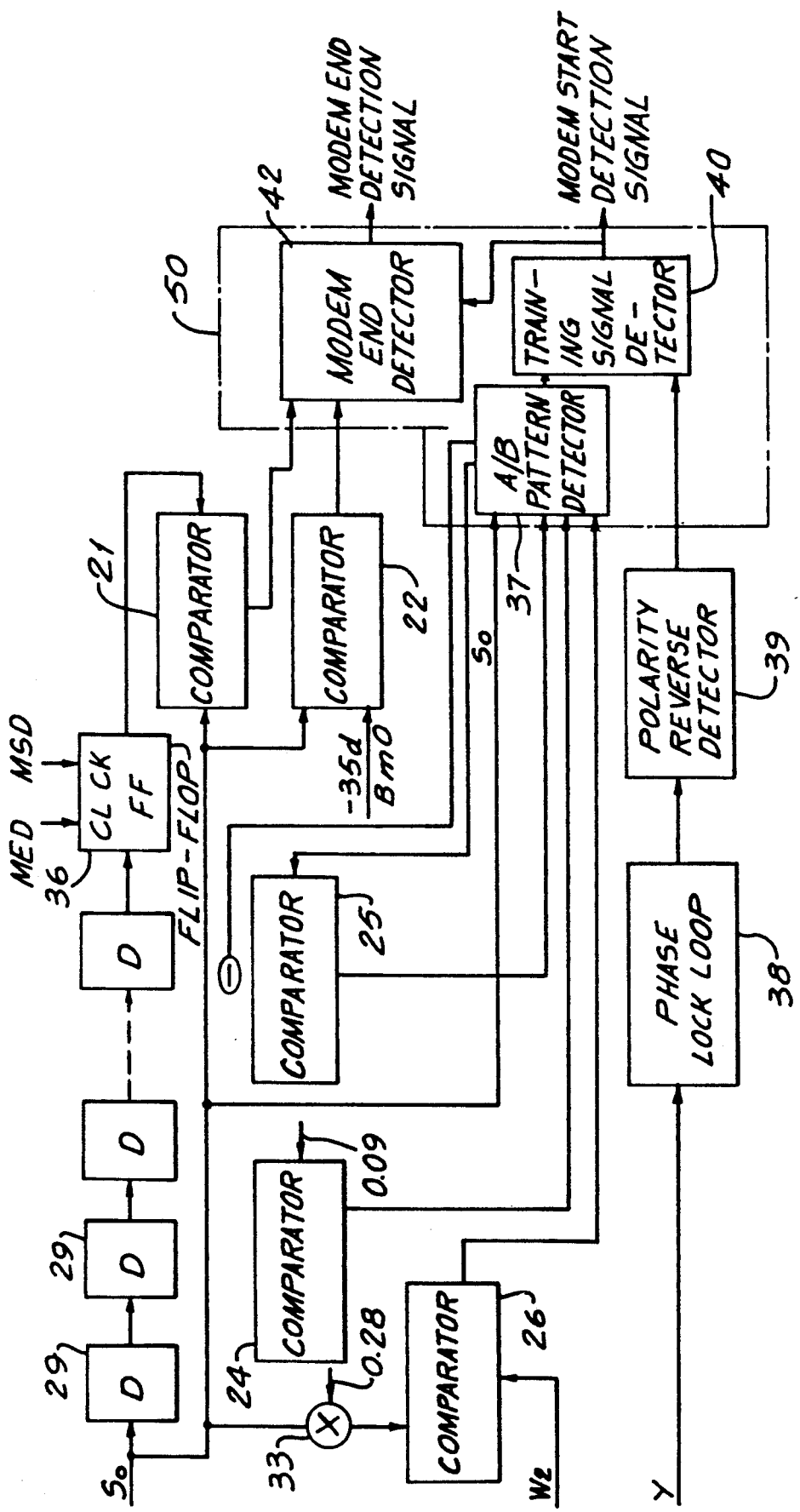
FIG. 8 is a block diagram of another embodiment of the comparison and decision circuit of the detector according to the present invention.
Figure 9:
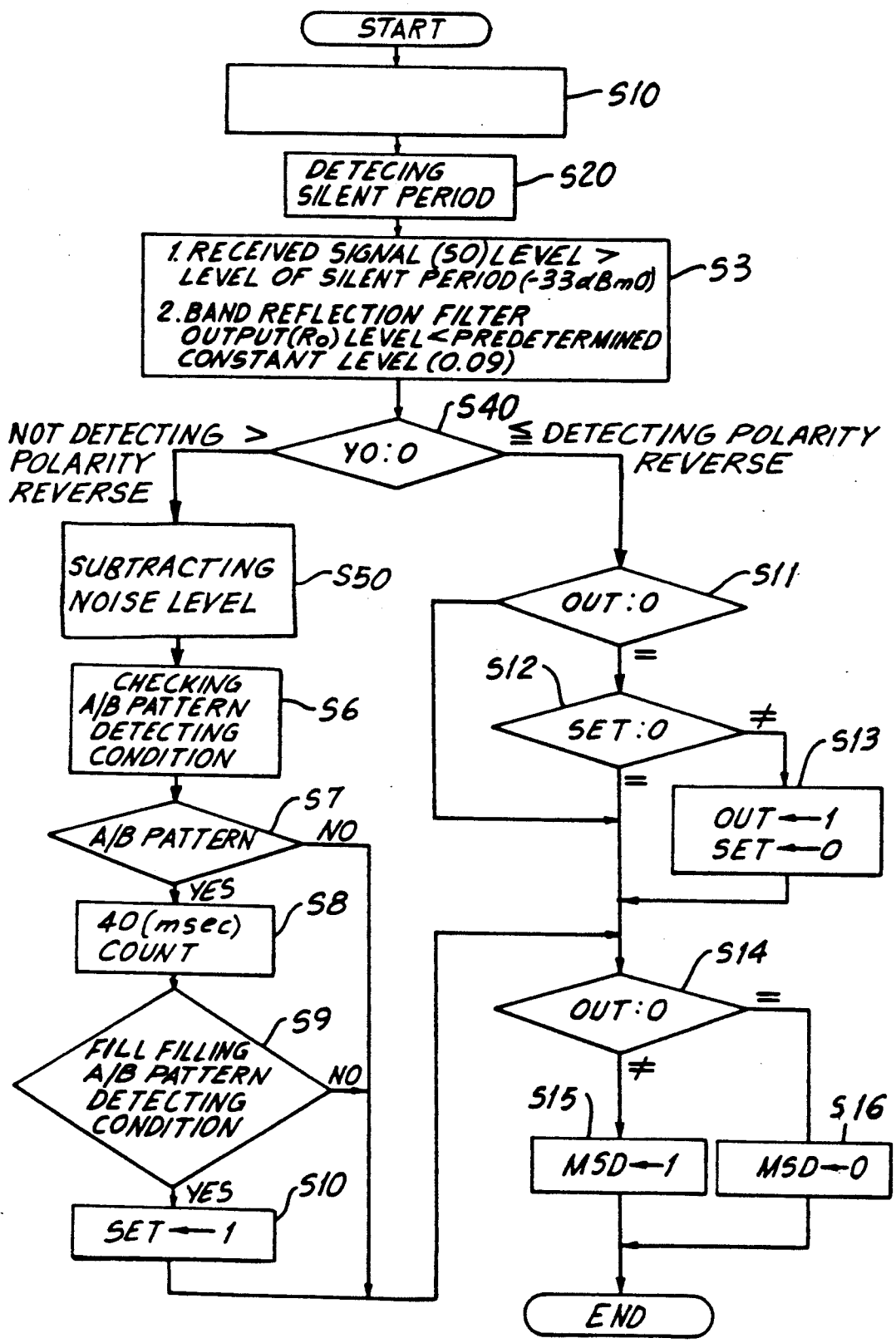
FIG. 9 is a flow chart showing operation steps of the embodiment of FIG. 8.

FIG. 8 is a block diagram of this embodiment and FIG. 9 is a flow chart of operation steps thereof. The operation sequence of the A/B pattern detector 37 and training signal detector 40 in FIG. 8 will be explained below.

First, a mean value of the total voltage of input signals is obtained from the receiving signal output $S_o$ in the A/B pattern detector 37 (step S10). A threshold value for identifying the silent period is decided based on the mean value of the voltage of signal $S_o$ applied to the comparator 25 to detect the silent period (segment 1) (step S20). Next, operation shifts to step S3 similarly to step S3 of FIG. 6.

Switching from the A/B pattern to the C/D pattern is made when the detected output of the PLL circuit 38 detects zero-cross with the output from the polarity reverse detector 39 due to a phase reverse from the A/B pattern to the C/D pattern (step 40).

When zero-cross is not detected in the step (step S4) for detecting zero-cross, a line noise component is eliminated (step S50) and thereafter operation shifts to the A/B pattern detection process (steps S6 and S10).

Namely, when the silent period of the modem training signal is detected, a mean value of the signal level in the silent period is calculated from the receiving signal output $S_o$ in the A/B pattern detector 37. In step S50, a mean value S1 of the silent period signal (corresponding to a mean value of a line noise component) is subtracted from the receiving signal output $S_o$ in a conventional subtracter. Therefore, as shown in FIG. 7B, the input signal does not include a line noise component.

Here, the A/B pattern has the level three times as high as that for the line noise signal component and therefore the A/B pattern detection can be reliably obtained even when the line noise component is subtracted.

On the other hand, since the line noise signal component in the silent period becomes very low because a mean value thereof is subtracted from the receiving signal, in case a line noise component, which is similar to the A/B pattern, is input, it does not satisfy the signal level detecting condition for the A/B pattern after step S6 and therefore erroneous detection never takes place.

The processing for subtracting the line noise component is not carried out for the signal which is actually transmitted to the modem system. Other sequence steps in FIG. 9 are similar to those of FIG. 6.

Figure 10:
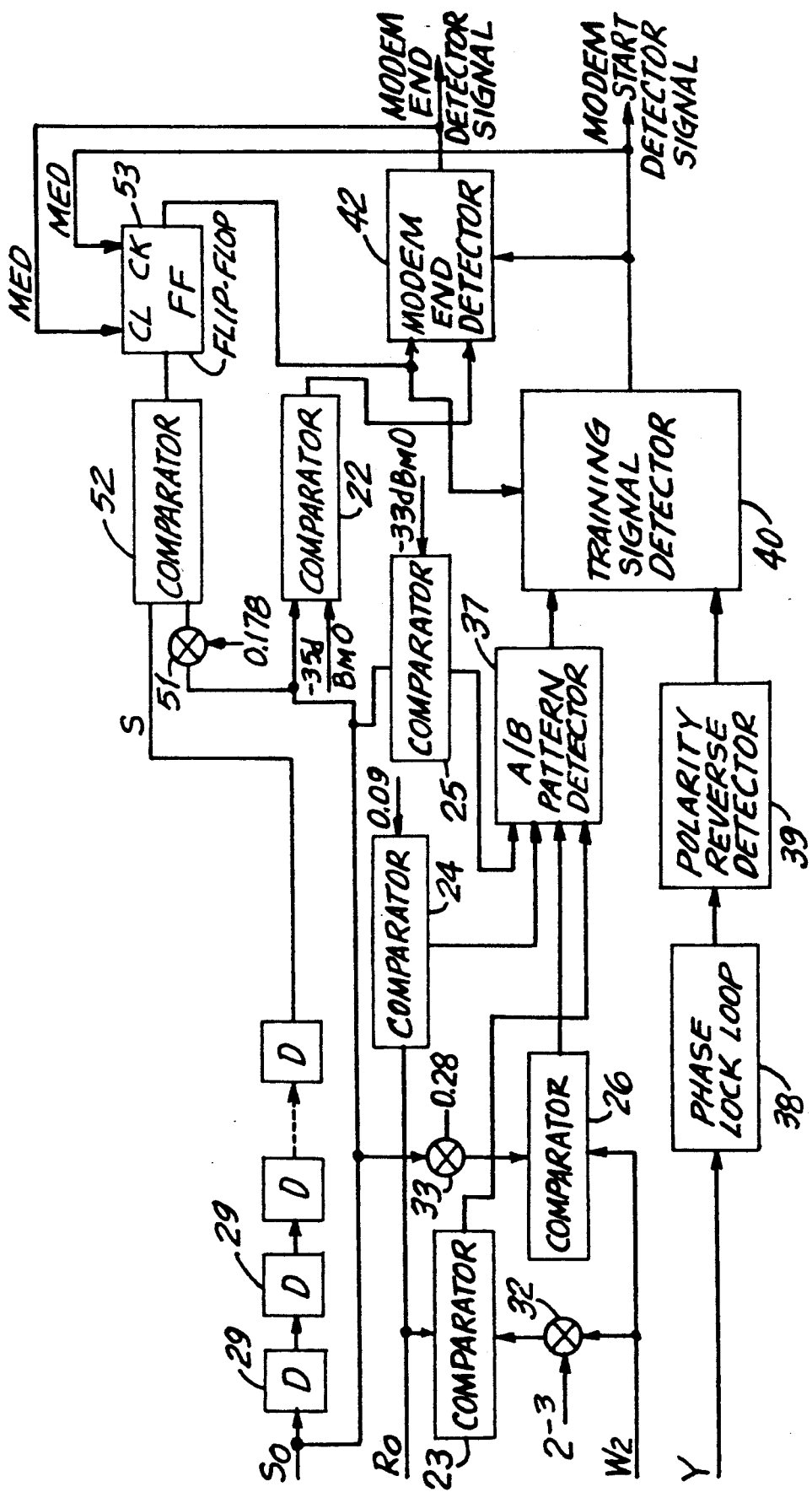
FIG. 10 is a block diagram of yet another embodiment of the system for detecting a start of the modem communication.

FIG. 10 is a block diagram of an embodiment of the system for detecting the start of the modem communication (detecting training signal).

In this embodiment, communication quantity (SN) of transmission path is monitored at the time of detecting the start of the modem communication. Only when SN is higher than a predetermined level, the start of the modem communication is decided and the modem communication start detecting signal MSD is output. When SN is lower than a predetermined level, SN is insufficient and communication is impossible, the modem start detecting signal MSD is reset, the modem communication end signal is transmitted to the end detector 42 and the operational sequence is returned to the A/B pattern detecting process by the modem training signal.

Usually, when considering modem data transmission, a modem data error rate should not exceed $10^{-5}$. The theoretical value of line quality (SN) required for acquiring such service quality is 21 dB or less. Therefore, the SN of the training signal is monitored for the start of the modem communication. When SN becomes 21 dB or less, the modem communication start detecting signal MSD is output as a non-detecting condition even when the modem signal is received. Actually, the threshold value of SN is set to 15 dB, adding a margin of 6 dB to the theoretical SN. A signal power level for calculating SN is calculated from the signals of segment 1 and segment 2.

Explanation will be now made referring to FIG. 10. When the training signal detector 40 detects switching from the A/B pattern to C/D pattern with an output from the polarity detector 39, it outputs the modem communication start detecting signal MSD. Thereby, a level comparison result (output of comparator 52) between the signal receiving output $S_o$ and output of delay circuit 29 is set to the flip-flop circuit 53 (FF).

The delay circuit 29 adjusts a delay time so that the level of the signal in segment 1 (SEG1) which is a level in the silent period, corresponding to noise level, is output when the training signal detector 40 detects switching from the A/B pattern to the C/D pattern. Moreover, a multiplier 51 is provided in this embodiment, which multiplies the value of the current receiving signal output $S_o$ by 0.178. Namely, as explained above, the output S (noise level) of delay circuit 29 and receiving signal output $S_o$ should be in the following relation:

$$S_o/S > 15 \text{ dB}$$

Therefore, it is detected whether the SN of the training signal is larger or smaller than 15 dB by comparing $S_o/15$dB and S in the comparator 52 and then the result is applied to the flip-flop circuit 53.

Accordingly, the receiving signal output $S_o$ is multiplied by $1/15$ dB=0.178 in the multiplier 51.

The modem communication end detector 42 decides whether the SN of the training signal is larger than 15 dB or not with the output of the flip-flop circuit 53. When it is larger than 15 dB, it is decided that the modem communication is possible, the modem communication start detecting signal MSD of training signal detector 40 is validated and the voice coding mode is switched to the modem coding mode.

When it is detected that SN is smaller than 15 dB, the line quality is non-satisfactory, it is decided that the modem communication is disabled, the modem communication start detecting signal MSD is invalidated and the modem communication end detecting signal MED is output for resetting the flip-flop circuit 53 (FF). Therefore, the mode switching is not carried out, and operational sequence returns to the detection of the silent period of the modem training signal and detection of the A/B pattern.

For detection of a modem signal, the SN of receiving signal output $S_o$ is monitored to decide whether or not it satisfies the value required for the modem communication. Only when the SN is satisfactory, the modem detection result is considered to be significant. Therefore, if the line quality is not satisfactory, the end of the modem communication can be executed immediately.

Thus, when the modem communication is disabled, the modem coding mode can be switched back to the voice coding mode.

Now, the detection of the end of the modem communication will be explained in detail.

In the embodiments of FIG. 5 and FIG. 8, the end of the modem communication is detected by the modem end detector 42 when the receiving signal output $S_o$ drops to a value exceeding a predetermined level such as $-35$ dBmO by the comparator 22.

However, when the line quality is non-satisfactory and a noise level is high, the receiving level becomes sometimes higher than $-35$ dBmO. In this case, the end of the modem communication cannot be detected and therefore the possibility exists that the modem signal coding mode will be switched back to the voice signal coding mode. When the signal is transmitted using the 32 Kbits/sec line, it cannot be transmitted if the end of the modem communication cannot be detected. Thereby, a fault disabling disconnection of the line may be generated.

For this reason, in the embodiment of FIG. 10, the end of the modem communication is reliably detected even in case the noise level is high.

Namely, a threshold level is set by adding a margin of a constant rate to the receiving signal level in the silent period of segment 1 of the modem training signal; this threshold level is compared with the level of the receiving output signal $S_o$ after the start of the modem communication, thereby the end of the modem communication is decided when the level of receiving output signal $S_o$ becomes lower than the threshold level.

Figure 11:
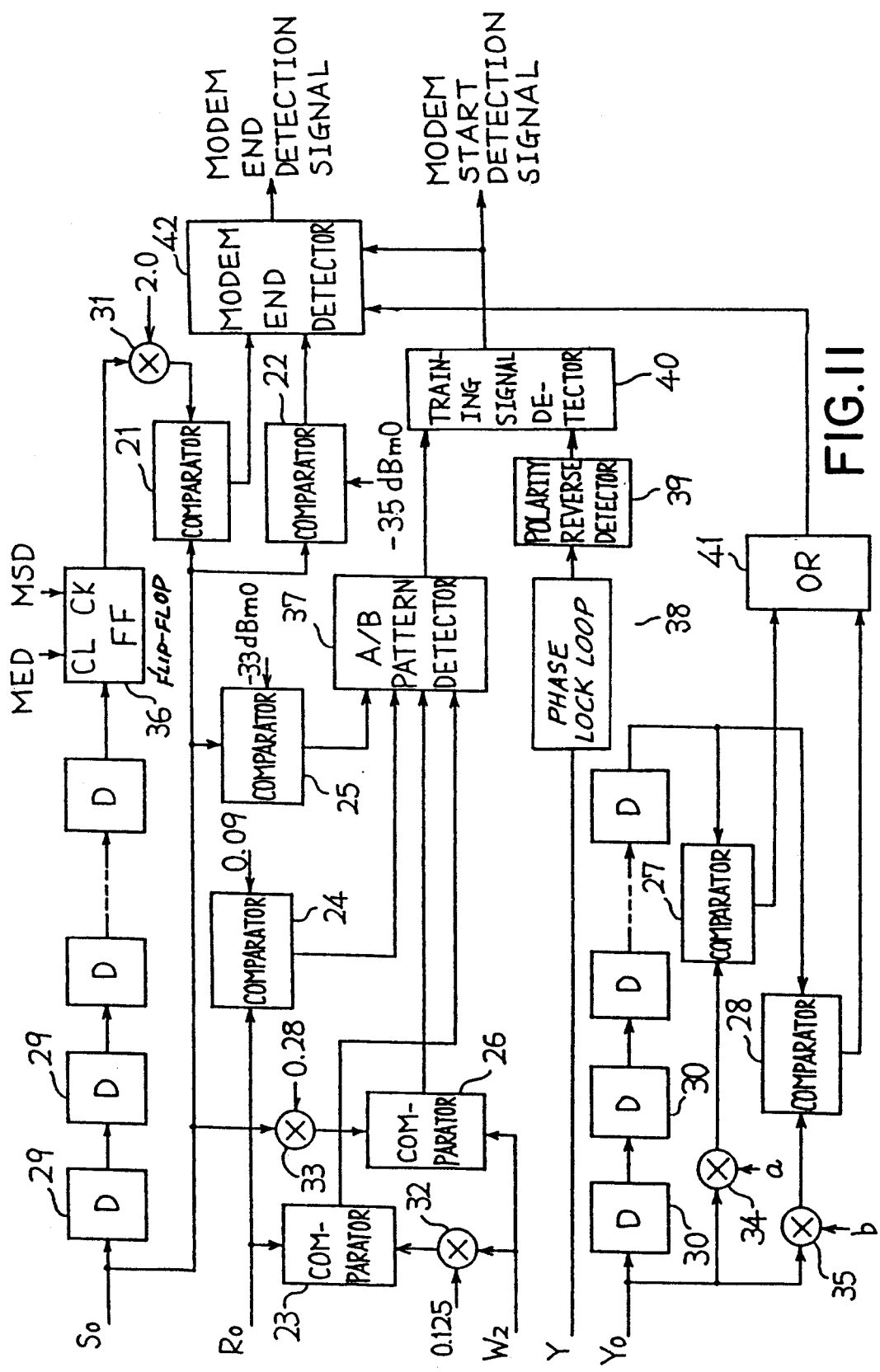
FIG. 11 is a block diagram of still another embodiment of the comparison and decision circuit.

FIG. 11 is a block diagram of yet another embodiment of the comparison and decision circuit 18, which includes comparators 21 through 28, delay circuit elements 29 and 30, multipliers 31 through 35, a flip-flop circuit 36 (FF); an A/B pattern detector 37, a phase lock loop (PLL) circuit 38; a polarity detector 39; a training signal detector 40; an OR circuit 41 and a modem end detector 42.

The receiving output signal $S_o$ is applied to the flip-flop circuit 36 via the delay circuit consisting of a plurality of delay elements 29. The flip-flop circuit 36 is cleared when the modem communication end detecting signal MED is applied to the clear terminal CL and stores the receiving output signal $S_o$ when the modem communication start detecting signal MSD is applied to the clock terminal CK. Therefore, a delay time of the delay circuit is set so that when the detection of the start of the modem communication is conducted through a phase inversion between segments 2 and 3 of the modem training signal, the level of the receiving output signal $S_o$ in the silent period of segment 1 is stored.

The threshold level for the detection of the end of the modem communication is obtained by multiplying 2.0 (margin for end detection) by the value of the output signal of the flip-flop circuit 36 in the multiplier 31 and this threshold level is compared with the receiving output signal $S_o$ in the comparator 21. A constant level corresponding to the silent period, for example, $-35$ dBmO is compared with the level of receiving output signal $S_o$ in the comparator 22. The comparison output signals of comparators 21, 22 are input to the end detector 42.

The receiving output signal $S_o$ is input to the comparator 26 via multiplier 33 and to comparator 25. In the comparator 25 it is compared with a constant level, −33 dBmO higher than the level corresponding to the silent period. The comparison output signal is input to the A/B pattern detector 37. The receiving output signal $S_o$ is multiplied by 0.28 in the multiplier 33, the obtained level is compared with the receiving output signal $W_2$ of 2900 Hz and the comparison output signal is input to the A/B pattern detector 37.

The band reflection output signal $R_o$ is compared with 0.09 in the comparator 24 and the comparison output signal is input to the A/B pattern detector 37. The receiving output signal $W_2$ of 2900 Hz is multiplied by $2^{-3}$, or 0.125, the multiplied output signal is compared with the band reflecting output signal $R_o$ in the comparator 23 and the comparison output signal is input to the A/B pattern detector 37.

Accordingly, the A/B pattern detector 37 has a logical structure adapted to decide reception of the A/B pattern when: the receiving output signal $S_o$ has a level higher than −33 dBmO; the level of band reflection output signal $R_o$ is lower than 0.09; 0.125 times (⅛) of the level of the receiving signal $W_2$ of 2900 Hz is higher than the level of the band reflection output signal $R_o$, and the level of receiving output signal $W_2$ of 2900 Hz is higher than 0.28 times of the level of receiving output signal $S_o$, and then the decided and detected signal is applied to the training signal detector 40.

The phase lock loop (PLL) circuit 38 is constructed for locking the phase to 1700 Hz signal Y. After the phase locking operation has been carried out in the segment 2 of the modem training signal, the phase of 1700 Hz signal Y is inverted in the segment 3 of the C/D pattern and thereby polarity of the phase control voltage of PLL circuit 38 is reversed. It is detected in the polarity detector 39 and a polarity reverse detection signal is applied to the training signal detector 40. Therefore, the training signal detector 40 outputs the modem communication start detection signal because the polarity reverse detection is carried out after detection of the A/B pattern. This start detection signal is applied to the end detector 42.

The receiving output signal $Y_o$ of 1700 Hz is input to the comparators 27, 28 via the delay circuit elements 29 and is compared with the receiving output signal $Y_o$ of 1700 Hz multiplied by the constants a, b in the multipliers 34, 35. The constants a, b are set in correspondence with the receiving level of the training signal of 1700 Hz. When the delay time of the delay circuit is set to Δ, such constants are selected to satisfy the relation, a $Y_o(n) < Y_o(n-\Delta) < Y_o(n)$. After comparison in the comparator 27, 28, the comparison output signal is applied to the modem end detector 42 via the OR circuit 41.

According to experiments conducted by the inventors of the present invention, level fluctuation of the carrier signal (1700 Hz signal) during the modem communication is very low and fluctuation range is about +3 dB. Therefore, values of a and b are set to satisfy the following relations:

$$a\ Y_o(n) = Y_o(n) - 3\ dB,\ b\ Y_o(n) = Y_o(n) + 3\ dB.$$

Namely, even when the level of receiving output signal $Y_o$ of 1700 Hz is increased or decreased by 3 dB or more, the carrier signal of 1700 Hz is decided to be not received (not during the modem communication).

The modem end detector 42 has a logical structure to start the detecting operation when the start detecting signal is applied and to execute the modem end detection with the comparison output signal transmitted from comparators 27, 28 via the comparators 21, 22 and OR circuit 41. Detector 42 also outputs the modem communication end detecting signal with the comparison output signal of the comparator 21 when the level of receiving output signal $S_o$ becomes lower than the receiving output signal $S_o$ indicating noise level in the silent period of segment 1, or with the comparison output of comparator 22 when the level of receiving output signal $S_o$ drops, exceeding −35 dBmO indicating the silent period, or with the comparison output of comparator 27 when the receiving output signal $Y_o$ of 1700 Hz multiplied by "a" becomes higher than the level of a preceding receiving output signal $Y_o$ of 1700 Hz (delayed signal $Y_o$) or with the comparison output signal of comparator 28 when the receiving output signal $Y_o$ of 1700 Hz multiplied by value "b" becomes lower than the level of a preceding receiving output signal $Y_o$ of 1700 Hz (delayed signal $Y_o$).

Moreover, the following method is also effective for detection of the end of the modem communication, in addition to the method of multiplying an output of the flip-flop circuit (FF) 36 by 2.0. When the A/B pattern is switched to the C/D pattern in the training signal, circuit 36 outputs the silent level of segment 1. Here, since a noise level in the modem communication is so far lower than the signal level, the difference of at least 10 dB or more exists between the level stored in the flip-flop circuit 36 and the level during the modem communication. The level ($S_o$) when the modem communication ends is almost similar to the level stored in the flip-flop circuit 36 (level in the silent period) and the comparator 21 outputs a comparison output signal. When this condition is continued for 16 msec or longer, the end of the modem signal is decided. The duration of 16 msec is set, taking into consideration momentary intermission of the modem communication. When the signal level at the time of starting the modem communication becomes equal to that at the time of ending the modem communication, the end of the modem signal is detected.

Figure 12A:
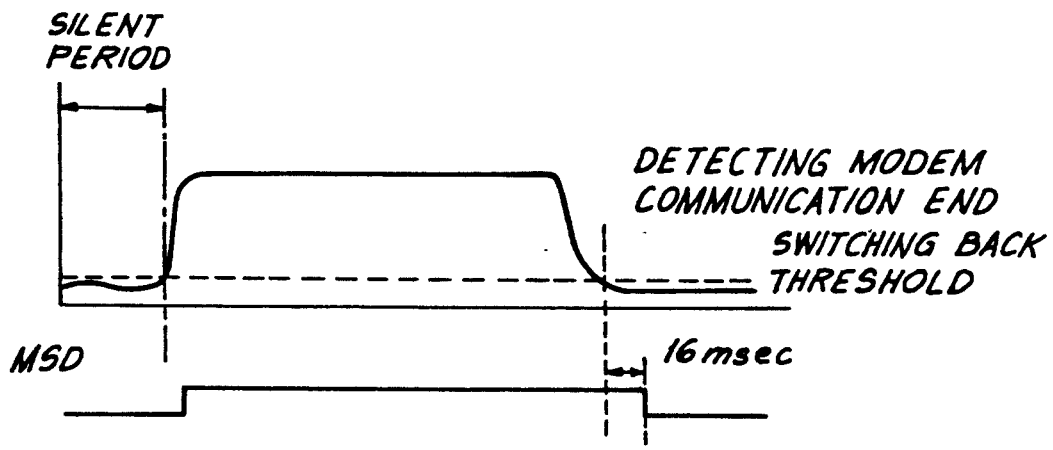
FIGS. 12A, 12B and 12C show respective waveforms of the modem communication signal.
Figure 12B:
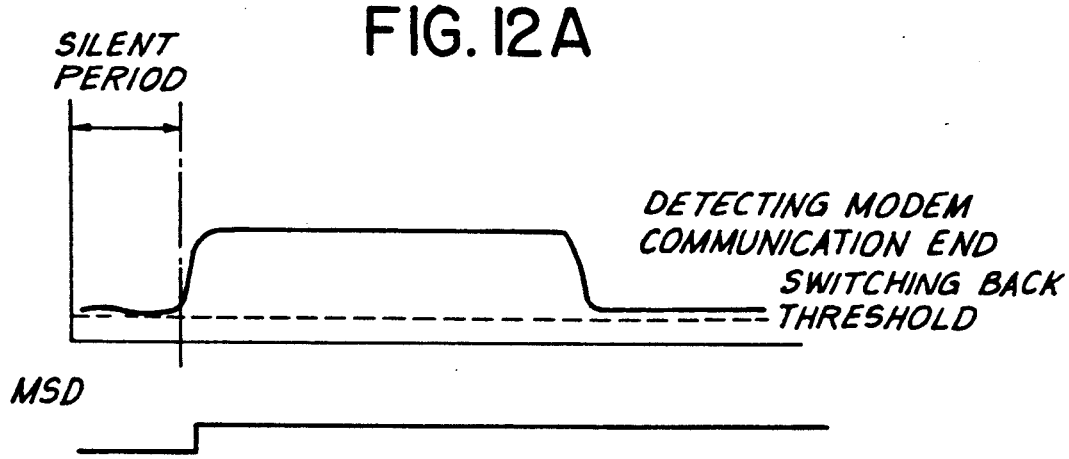
Figure 12C:
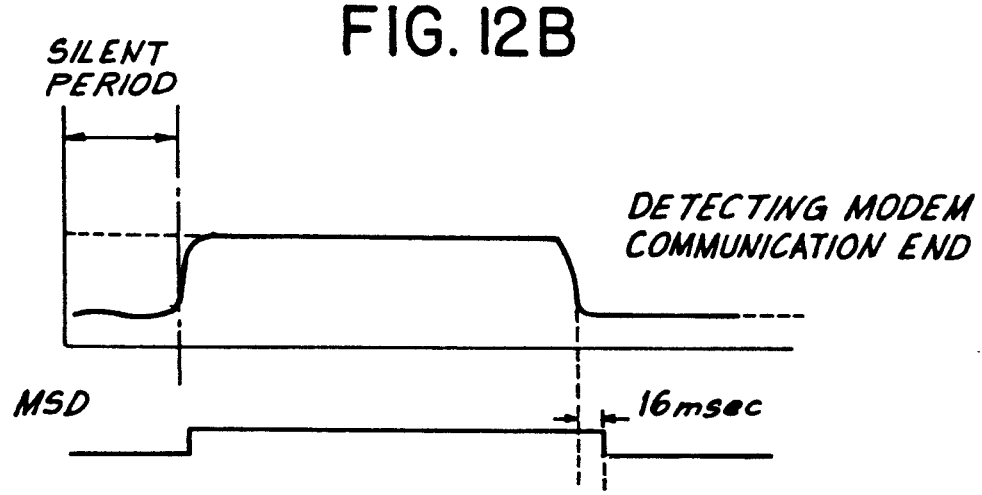

FIGS. 12A, 12B, 12C show modem signal waveforms for explaining operations of this embodiment.

As shown in FIG. 12A, the silent period appears prior to rising of MSD where the voice signal is switched to the modem signal. Thereafter, data communication starts after the end of training. Upon termination of the modem signal communication, the signal level drops to the level which is almost the same as the silent period of the training signal. However, here a problem arises that when noise appears on the line as shown in FIG. 12B, even if the modem signal is detected by the training signal detector and MSD changes from "0" to "1", it does not become lower than the switch-back threshold from the modem coding mode to the voice signal coding mode at the time of ending the modem signal communication and thereby a modem signal cannot be detected.

According to this embodiment, since the switchback threshold value of comparator 21 is set to the silent level of segment 1 of the modem training signal, the relation, where the level in the silent period is < the level during communication level 2, can be set during the modem communication. Since the level 3 after the end of the modem communication becomes almost equal to the level in the silent period 1, the modem communication or the end of the modem communication can be detected accurately from an output of the comparator 21.

Figure 13:
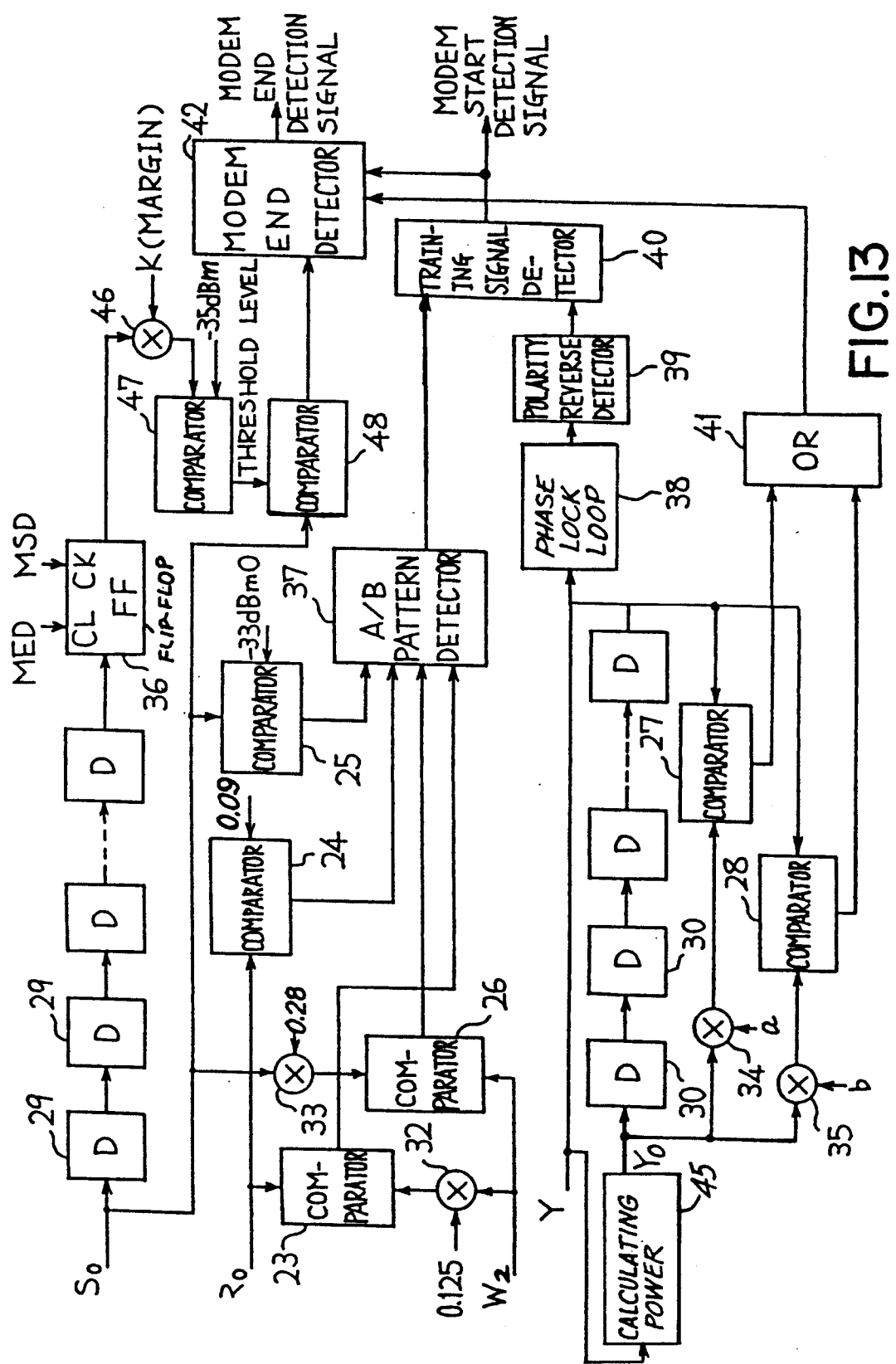
FIG. 13 is a block diagram of yet another modified embodiment of the comparison and decision circuit.

FIG. 13 is a modification of the embodiment of FIG. 11. In FIG. 13, reference numeral 45 denotes a power calculating unit supplying a receiving signal $Y_o$ to a delay circuit 30. The circuit of FIG. 13 further comprises a comparison and selection circuit 47 and a comparator 48. The receiving output signal $S_o$ is applied to the delay circuit 29 and comparator 48, and the delayed output signal is multiplied by a value larger than 1 as the margin k in the multiplier 46 and is then applied to the comparison and selection circuit 47. The comparison and selection circuit 47 compares the level of the output signal of the multiplier 46 with the level −35 dBmO in the silent period and selects a larger level than the threshold level. This threshold level is compared with the receiving output signal $S_o$ in the comparator 48.

Therefore, when the level of receiving output signal $S_o$ is lowered at the time when the modem communication ends, since it drops, exceeding a value obtained by the level of the receiving output signal $S_o$ multiplying the margin k or −35 dBmO, the end of the modem communication can be detected by the comparator 48.

Figure 14:
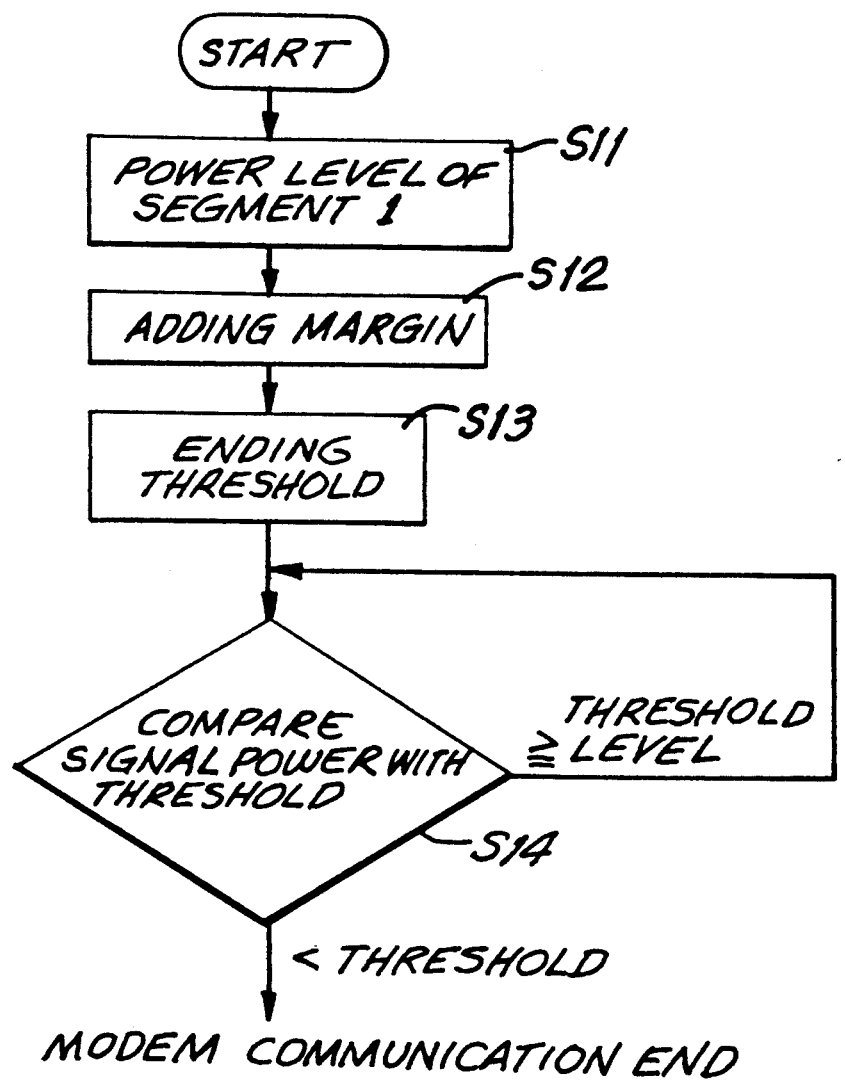
FIG. 14 is a flow chart diagram illustrating operation steps of a modem communication end detector of the circuits of FIGS. 11 and 13.

FIG. 14 is a flow chart showing operation steps of the end detector 42 shown in FIG. 11 and FIG. 13. Power of segment 1, namely the level of receiving output signal $S_o$ in the silent period of segment 1 of the modem training signal is obtained (step S11). Here, the offset value is added by multiplying a constant value by such level in the multiplier 31 (step S12). The resulting value is set as the end threshold (step S13) and it is compared with the signal power (step S14). Namely, the threshold level is obtained by adding a margin to the receiving output signal $S_o$ indicating the noise level in the silent period and it is compared with the level of receiving output signal $S_o$. When the level of receiving output signal $S_o$ is lower than the threshold level, the end of the modem communication is decided.

Figure 15:
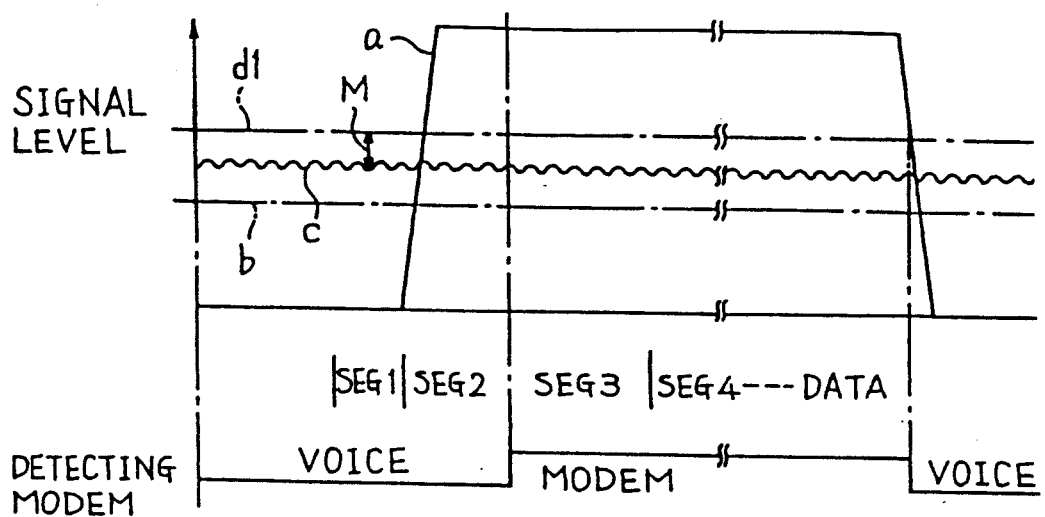
FIG. 15 is a diagram illustrating the operation of the circuit of FIG. 11.

FIG. 15 is a diagram for explaining operation of an embodiment shown in FIG. 11. In FIG. 15, "a" denotes a modem signal including the training signal; "b" is the fixed threshold level (−35 dBmO); "c" is the line noise level; "d1" is a threshold level adding margin M to the line noise level. SEG 1 to SEG 4 are segments 1 to 4 of the modem training signal.

Since the level of receiving output signal $S_o$ in the segment 1 of the modem training signal corresponds to the line noise level "c", the threshold level "d1" is set by adding the margin "M" to the receiving output signal $S_o$. The modem communication is started by phase inversion between the segments 2 and 3 of the training signal. When the level of the modem signal "a" drops to a value exceeding the threshold level "d1" due to the end of the modem communication, the end of the modem communication is decided and the voice communication may be started. In this case, when the fixed threshold level "b" is set as the threshold level for detecting the end of the modem communication, since the line noise level "c" is higher than the fixed threshold level "b", the modem communication end cannot be detected. However, in this embodiment, the end of the modem communication can be reliably detected by setting the threshold level "d1" based on the line noise level "c".

Figure 16:
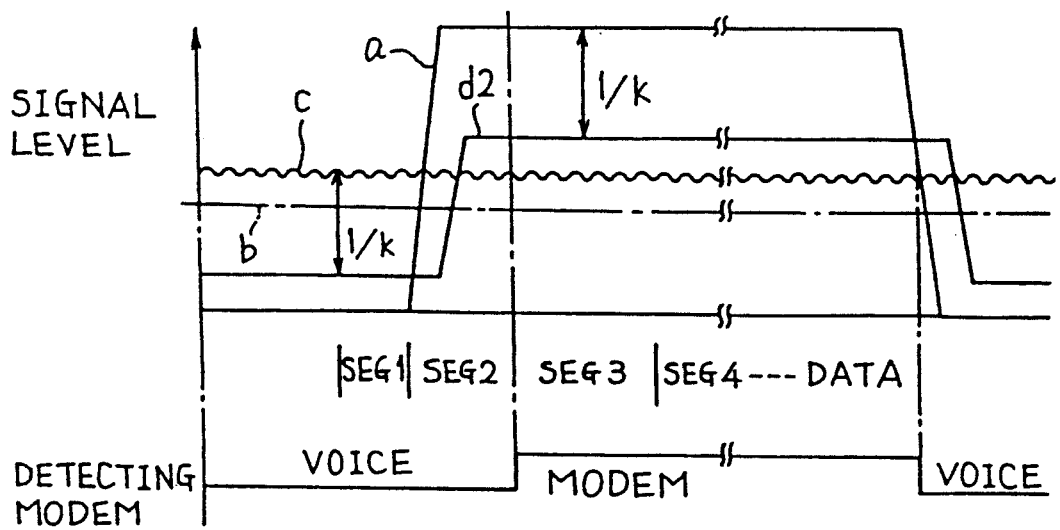
FIG. 16 is a diagram illustrating the operation of the circuit of FIG. 13.

FIG. 16 is a diagram for explaining operations of the embodiment shown in FIG. 13. The like elements in FIGS. 15 and 16 are denoted by the like reference numerals. In addition, "d2" denotes a threshold level. This threshold level "d2" delays the segments 2, 3, 4 in the modem training signal or the modem signal "a" during the modem communication and sets a value of delayed output signal 1/k. In this case, "k" is set so that the threshold level "d2" during the reception of the modem signal "a" becomes higher than the line noise level "c" and lower than the level of modem signal "a".

Therefore, the threshold level "d2" becomes "1/k" of line noise level "c" in the segment 1 (S1) of the modem training signal and becomes "1/k" of the level of the modem signal "a" after the delay time during the modem signal "a" after the segment 2 (S2) of the training signal. When the level of the modem signal "a" becomes lower than the threshold level d2, the end of the modem communication is detected and the modem communication mode is switched to the voice communication mode.

It should be further indicated with reference to FIGS. 11 to 16 that the threshold level for detecting the end of the modem communication is set by: (a) adding the margin of a constant rate to the receiving level of the line in the first silent period (segment 1) of the training signal period; (b) setting a value of 1/k of the threshold value by delaying the modem signal "a"; (c) multiplying the receiving output signal $Y_o$ of 1700 Hz by "a" and "b". However, such a threshold value may also be set with other means. For example, since the A/B pattern or C/D pattern of the segments 2 or 3 of the training signal may be identified easily, the threshold level may be set by multiplying a predetermined constant by any one of both signal levels. Moreover, the final detection result can be obtained by combining the results of the detection of the end of the modem communication based on various threshold levels explained above.

Figure 17:
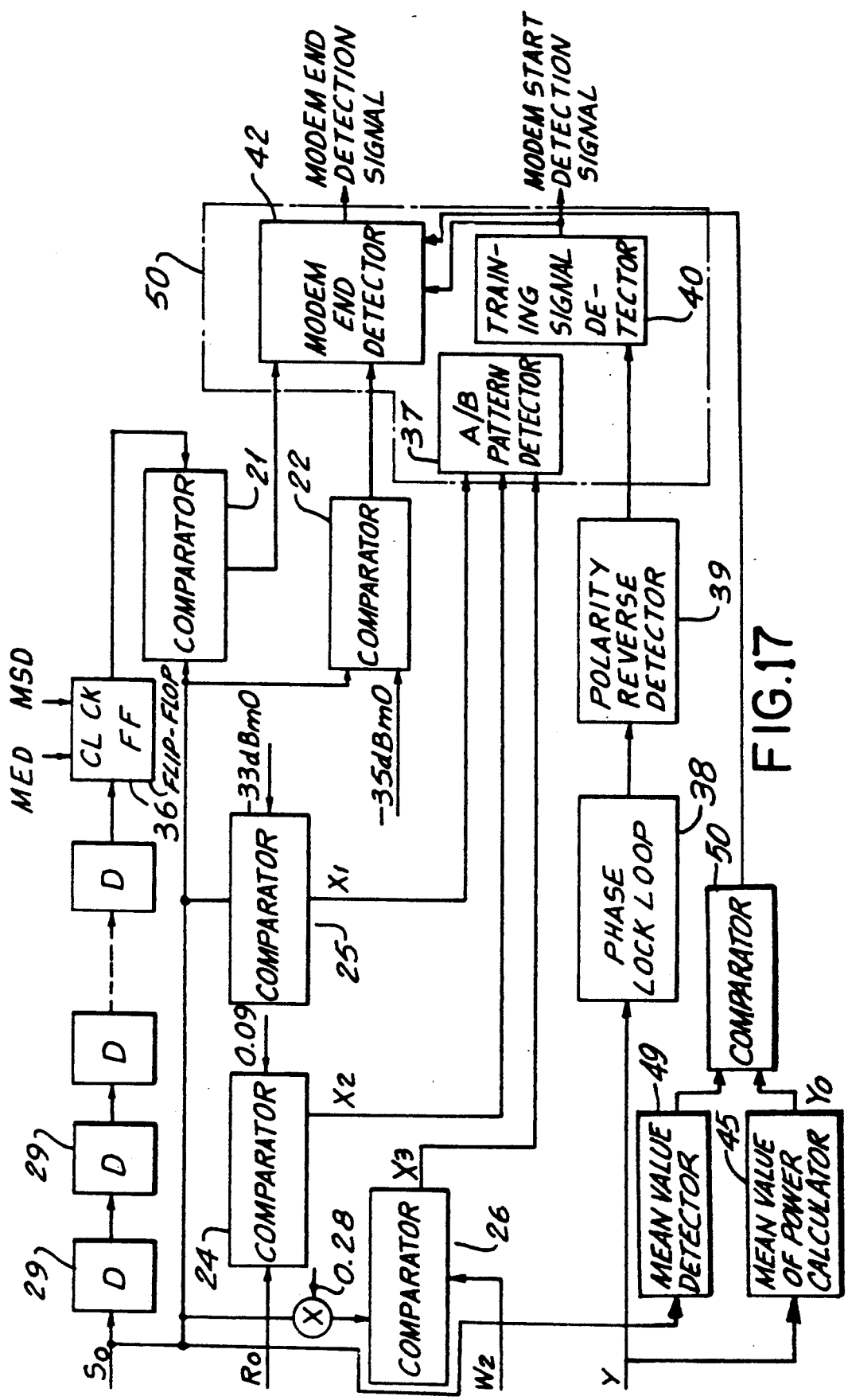
FIG. 17 is a block diagram of the detector for detecting the end of the modem communication of yet another embodiment.

FIG. 17 is a block diagram illustrating yet another embodiment of the circuit for detection of the end of the modem communication. In this embodiment, a signal power detector 49 detects power of the modem signals as a whole ($S_o$) and a carrier signal power calculator 45 provides a power signal by extracting the carrier frequency component Y (the signal of 1700 Hz in the case of CCITT recommendation, V.29) which always exists in the modem signal.

The comparator 50 compares the power of carrier frequency component from power calculator 45 with the power of the modem signal as a whole from detector 49 and transmits the result to the end detector 42.

Moreover, comparator 22 compares the level of receiving signal output $S_o$ with the level during the silent period (−35 dBmO) and sends the result to the modem end detector 42.

The modem end detector 42 decides that the modem communication is still continued when the level of receiving signal output $S_o$ is −35 dBmO or higher and the power of the carrier component (Y) is higher than a predetermined value (for example, ½) in comparison with the power of the receiving signal output $S_o$. However, when the power of the carrier component Y is lower than the predetermined value in comparison with the power of signal output $S_o$, the end detector 42 decides the end of the modem communication and outputs the modem communication end detecting signal MED.

As explained above, the end of the modem communication is decided when the threshold level is set in the setting circuit based on the signal level received through the line, the receiving signal level after the start of the modem communication is compared with the threshold level in the comparison and decision circuit and the receiving signal level becomes lower than the threshold level. In the case of comparison based on the fixed threshold level, the end of the modem communication cannot be detected in some cases when the line noise level is high. However, in this embodiment, since the threshold level is set based on the receiving signal level received through the line including the line noise level, the end of the modem communication can be reliably detected.

The receiving level of the line in the first silent period (segment 1) in the training signal corresponds to the line noise level, and the threshold level is obtained by adding the margin of a constant rate to the receiving level. Thereby, if the line noise level is high, the threshold level corresponding to such noise level may be set and therefore the end of the modem communication may be reliably detected.

Moreover, the signal level of segment 2 or segment 3 transmitted before the start of the modem communication of the training period is usually stabilized and, since the threshold level corresponding to the receiving signal level may be set by obtaining the threshold level by multiplying such stabilized level by a predetermined constant value, the end of the modem communication can be reliably detected.

Moreover, the level of the carrier signal (1700 Hz signal) during the modem communication is almost constant during the modem communication and the end of the modem communication can be detected reliably by setting the threshold level in accordance with the receiving level of the carrier signal. In this case, the condition for detecting the end of the modem communication may be set depending on whether the receiving level of the carrier signal is within the range of two kinds of high and low threshold levels.

In addition, since the level of the modem signal after the start of the modem communication is almost constant, the end of the modem communication can be reliably detected by setting the threshold level based on such receiving modem signal and then by comparing the threshold level with the level of the receiving modem signal.

There has been disclosed heretofore the best embodiment of the invention presently contemplated. However, it is to be understood that various changes and modifications may be made thereto without departing from the spirit of the invention.

What is claimed is:

1. A modem signal detector for detecting a modem training signal for use in an adaptive differential coding system, comprising:
   means for detecting and deciding a first signal pattern of a modem training signal;
   means for detecting a second signal pattern inverting a phase of the first signal after detection of the first signal pattern of the modem training signal;
   timer means for counting a time passage of a predetermined time period after detecting and deciding said first signal pattern; and
   reset means for resetting said detecting and deciding means of said first signal pattern when said second signal pattern is not detected within the predetermined time period counted by said timer means after detection and decision of said first signal pattern.

2. A modem signal detector for detecting a modem training signal having a silent period at the beginning thereof, comprising:
   a modem training signal detection circuit; and
   means supplying an input signal to said detection circuit;
   said detection circuit including:
   first means connected to said input signal supplying means for obtaining a mean value of a level of the input signal in the silent period of said modem training signal; and
   second means connected to said first means and to said input signal supplying means to receive said input signal therefrom and adapted to subtract said means value in the silent period from the input signal, whereby
   the modem training signal is detected with an input signal after subtraction of said mean value from said input signal.

3. A modem signal detecting and control system for detecting a start of a modem communication by monitoring a signal in a training period of a modem and detecting an end of the modem communication by monitoring a receiving signal of a transmission line, the system comprising:
   a comparison and decision circuit for deciding whether or not a transmission quality of a transmission line for the modem communication is decided to be suitable for the modem communication, said circuit including means for comparing signal power levels of the receiving signal and of a modem training signal in a silent period and a training period, output means for providing a modem signal detection output from said circuit when the signal power level of the modem training signal in the training period is higher than a predetermined threshold level and a modem communication disable signal when the signal power level of said receiving signal is lower than a predetermined threshold level, and a modem signal detection result is output from said circuit as a non-detecting condition.

4. A modem signal detecting and control system according to claim 3, wherein said circuit comprises multiplier means and wherein the threshold level is obtained by multiplying a receiving signal level of the line in the silent period transmitted first in said training period by a constant rate, the threshold level is compared with the level of a signal in the training period, the modem communication is decided to be possible when the level of said signal is higher than said threshold level, and a subsequent detecting result is output from said circuit.

5. A modem signal detecting and control system according to claim 3, further comprising means for measuring a receiving level in a first silent period of said training period, and setting means to set a signal power at the time preceding a predetermined period from a switching point from a first signal pattern of the modem training signal to a second signal pattern of the modem training signal as a receiving level in the silent period when the receiving level in the first silent period of said training period is measured.

6. A modem signal detecting and control system for detecting a start of a modem communication by monitoring a signal in a modem training period and detecting an end of the modem communication by monitoring a receiving signal, the system comprising:
   a threshold level setting circuit for setting a threshold of a signal power level; and
   a comparison and decision circuit connected to said setting circuit and being operative for deciding whether or not the modem communication has been terminated by comparing a signal power threshold level set in said setting circuit and a power level of said receiving signal;

wherein the threshold level is set in said setting circuit on the basis of the power level of a signal received through a transmission line, said threshold level is compared with he power level of the receiving signal after the start of the modem communication in said comparison and decision circuit and the end of the modem communication is decided when said power level of the receiving signal becomes lower than said threshold level.

7. A modem signal detecting and control system for detecting a start of a modem communication by monitoring a signal in a modem training period and detecting an end of the modem communication by monitoring a receiving signal, the system comprising:

a threshold level setting circuit; and a comparison and decision circuit connected to said setting circuit and being operative for deciding whether or not the modem communication has been terminated by comparing a threshold level set in said setting circuit and a level of said receiving signal;

wherein the threshold level is set in said setting circuit on the basis of the power level of a signal received through a transmission line, said threshold level is compared with the power level of the receiving signal after the start of the modem communication in said comparison and decision circuit and the end of the modem communication is decided when said power level of the receiving signal becomes lower than said threshold level, and wherein multiplier means is provided and wherein he threshold level of said setting circuit is obtained by multiplying the power level of the signal received through the transmission line in a first transmitted silent period of said modem training period by the margin of a constant rate.

8. A modem signal detecting and control system according to claim 7, wherein the threshold level of said setting circuit is obtained by multiplying a level of a signal of a time period subsequent to said silent period by a predetermined constant value, said level being transmitted immediately before the start of the modem communication during said training period.

9. A modem signal detecting and control system for detecting a start of a modem communication by monitoring a signal in a modem training period and detecting an end of the modem communication by monitoring a receiving signal, the system comprising:

a threshold level setting circuit; and a comparison and decision circuit connected to said setting circuit and being operative for deciding whether or not the modem communication has been terminated by comparing a threshold level set in said setting circuit and a level of said receiving signal;

wherein the threshold level is set in said setting circuit on the basis of the power level of a signal received through a transmission line, said threshold level is compared with the power level of the receiving signal after the start of the modem communication in said comparison and decision circuit and the end of the modem communication is decided when said power level of the receiving signal becomes lower than said threshold level, and wherein said comparison and decision circuit includes comparison means, and wherein the threshold level is set in said setting circuit in accordance with a carrier component of the receiving signal after the start of said modem communication, and wherein the power level of the carrier component of the receiving signal in the transmission line is compared in said comparison means with the threshold level set in said setting circuit, and the end of the modem communication is decided in said decision circuit when the level of the carrier component of said receiving signal becomes lower than said threshold level.

10. A modem signal detecting and control system for detecting a start of a modem communication by monitoring a signal in a modem training period and detecting an end of the modem communication by monitoring a receiving signal, the system comprising:

a threshold level setting circuit; and a comparison and decision circuit connected to said setting circuit and being operative for deciding whether or not the modem communication has been terminated by comparing a threshold level set in said setting circuit and a power level of said receiving signal;

wherein the threshold level is set in said setting circuit on the basis of the level of a signal received through a transmission line, said threshold level is compared with the power level of the receiving signal after the start of the modem communication in said comparison and decision circuit and the end of the modem communication is decided when said power level of the receiving signal becomes lower than said threshold level, and wherein said comparison and decision circuit includes comparison means and wherein the threshold level is set in said setting circuit on the basis of a receiving signal level during the modem communication after the start of said modem communication, and wherein said threshold level is compared with the level of said receiving signal in said comparison means and the end of said modem communication is decided in said decision circuit when said receiving signal level becomes lower than said threshold level.

11. A modem detector comprising:

a signal power detector for detecting total power of an input signal at the time of transmitting data through a telephone line using a modem;

a carrier component power detector which extracts a carrier component contained in said input signal and detects the power of the extracted carrier component; and a decision circuit constructed to provide a decision result of an end of a data transmission when an output of said carrier component power detector becomes lower than a predetermined value in comparison with an output of said signal power detector.

12. A modem signal detecting system for detecting a start of a modem communication by monitoring a signal in a training period of a modem and detecting an end of the modem communication by monitoring a receiving signal of a transmission line, the system comprising a detection circuit including signal power level calculator means, comparator means receiving calculated signals from said calculator means, and detection means connected to said comparator means, wherein a noise level in a silent period transmitted first in a modem training signal is calculated and stored in said calculator means, the signal power level during the modem communication is always calculated and compared by said comparator means with the signal power level before the modem communication and an end of a modem signal is detected by said detection circuit when the signal level before and after the modem signal communication is of the same value.

* * * * *